(12) United States Patent
Tagesson et al.

(10) Patent No.: US 9,598,089 B2
(45) Date of Patent: **\*Mar. 21, 2017**

(54) METHOD AND ARRANGEMENT FOR VEHICLE STABILIZATION

(75) Inventors: Kristoffer Tagesson, Göteborg (SE); Leo Laine, Härryda (SE); Sogol Kharrazi, Linköping (SE)

(73) Assignee: Volvo Lastvagnar AB, Göteborg (SE)

(\*) Notice: Subject to any disclaimer, the term of this patent is extended or adjusted under 35 U.S.C. 154(b) by 172 days.

This patent is subject to a terminal disclaimer.

(21) Appl. No.: 14/354,570

(22) PCT Filed: Oct. 31, 2011

(86) PCT No.: PCT/SE2011/000194
§ 371 (c)(1),
(2), (4) Date: Oct. 29, 2014

(87) PCT Pub. No.: WO2013/066216
PCT Pub. Date: May 10, 2013

(65) Prior Publication Data
US 2015/0232088 A1    Aug. 20, 2015

(51) Int. Cl.
*B60W 40/114* (2012.01)
*B60W 40/13* (2012.01)
*B60W 30/02* (2012.01)

(52) U.S. Cl.
CPC .......... *B60W 40/114* (2013.01); *B60W 30/02* (2013.01); *B60W 40/13* (2013.01); *B60W 2040/1346* (2013.01)

(58) Field of Classification Search
CPC .... B60W 40/114; B60W 40/13; B60W 30/02; B60W 2040/1346
See application file for complete search history.

(56) References Cited

U.S. PATENT DOCUMENTS 3,948,567 A \* 4/1976 Kasselmann ......... B60T 8/1708
                                                         180/14.1
4,345,775 A \* 8/1982 Merrifield ............. B62D 13/06
                                                         280/443
(Continued)

FOREIGN PATENT DOCUMENTS

DE          10048418 A1     4/2002
DE      102008028081 A1    12/2009
(Continued)

OTHER PUBLICATIONS

Supp. European Search Report (Jul. 10, 2015) for corresponding European App. EP 11 87 5078.
(Continued)

*Primary Examiner* — Dale W Hilgendorf
(74) *Attorney, Agent, or Firm* — WRB-IP LLP

(57) ABSTRACT

An arrangement for improving stability of a vehicle combination includes a towing vehicle and at least one towed vehicle, where the at least one towed vehicle includes an actively steered axle and/or individual brake on at least one axle, where the towing vehicle and the at least one towed vehicle each includes a lateral acceleration determining arrangement. A vehicle combination model is adapted for determining a desired delay value between the lateral acceleration of the towing vehicle and the lateral acceleration of the at least one towed vehicle, where the arrangement is adapted to stabilize the at least one towed vehicle by using the determined lateral acceleration of the towing vehicle and the desired delay value for the at least one towed vehicle to establish a desired lateral acceleration for the at least one towed vehicle, and to control the steered axle and/or the individual brake of the at least one towed vehicle such that the determined lateral acceleration of the at least one towed (Continued)

vehicle corresponds to the desired lateral acceleration of the at least one towed vehicle.

15 Claims, 3 Drawing Sheets

(56) References Cited

U.S. PATENT DOCUMENTS

| | | | | |
|---|---|---|---|---|
| 5,607,028 | A * | 3/1997 | Braun | B62D 7/1509 180/415 |
| 5,747,683 | A | 5/1998 | Gerum et al. | |
| 6,223,114 | B1 | 4/2001 | Boros et al. | |
| 6,498,977 | B2 * | 12/2002 | Wetzel | B60T 8/1708 701/70 |
| 6,655,710 | B2 * | 12/2003 | Lindell | B60D 1/30 180/412 |
| 7,925,409 | B2 | 4/2011 | Fry et al. | |
| 2005/0060082 | A1 * | 3/2005 | Heuer | B60T 8/172 701/70 |
| 2005/0206229 | A1 * | 9/2005 | Lu | B60T 8/1708 303/123 |
| 2005/0206231 | A1 * | 9/2005 | Lu | B60T 8/1755 303/146 |
| 2005/0206235 | A1 * | 9/2005 | Tseng | B60T 8/1708 303/146 |
| 2006/0033308 | A1 * | 2/2006 | Waldbauer | B60T 8/1708 280/455.1 |
| 2006/0125313 | A1 * | 6/2006 | Gunne | B60T 8/1708 303/7 |
| 2006/0129298 | A1 | 6/2006 | Takeda | |
| 2006/0173584 | A1 * | 8/2006 | Einig | B60T 8/1708 701/1 |
| 2006/0204347 | A1 * | 9/2006 | Waldbauer | B60T 8/1708 410/156 |
| 2006/0206253 | A1 * | 9/2006 | Yu | B62D 6/002 701/70 |
| 2006/0229782 | A1 * | 10/2006 | Deng | B62D 6/003 701/41 |
| 2007/0179735 | A1 | 8/2007 | Fiedler et al. | |
| 2007/0255475 | A1 | 11/2007 | Dagh et al. | |
| 2007/0260384 | A1 | 11/2007 | Romanchok et al. | |
| 2007/0260386 | A1 * | 11/2007 | Tandy | B60T 8/1708 701/70 |
| 2008/0036296 | A1 * | 2/2008 | Wu | B60T 8/1708 303/146 |
| 2008/0172163 | A1 * | 7/2008 | Englert | B60T 8/1708 701/83 |
| 2009/0005946 | A1 * | 1/2009 | Futamura | B60T 8/1708 701/70 |
| 2009/0210112 | A1 * | 8/2009 | Waldbauer | B60T 8/1708 701/42 |
| 2009/0236823 | A1 | 9/2009 | Prem et al. | |
| 2010/0066161 | A1 | 3/2010 | Fry et al. | |
| 2010/0070149 | A1 | 3/2010 | Fry et al. | |
| 2011/0202238 | A1 | 8/2011 | Cebon et al. | |
| 2012/0109471 | A1 * | 5/2012 | Wu | B60T 8/1708 701/49 |

FOREIGN PATENT DOCUMENTS

| | | |
|---|---|---|
| GB | 2447689 A | 9/2008 |
| WO | 0206101 A1 | 1/2002 |
| WO | 2008114039 A1 | 9/2008 |

OTHER PUBLICATIONS

Chinese Official Action (Dec. 10, 2015) for corresponding Chinese App. 201180074620.4.
Wu et. al."Analysis of dynamic lateral response for a multi-axle-steering tractor and trailer", Heavy Vehicle Systems, A Special Issue of the Int. J. of Vehicle Design, vol. 10, No.4, pp.281-294.; abstract; p. 288; figures 1,4-6; Section 5, "Conclusions", Date 2003.
Bahaghighat M.K et al "Predictive Yaw and Lateral Control in Long Heavy Vehicles Combinations", 49th IEEE Conference on Decision and Control, Dec. 15-17, 2010.; abstract; figures 2, 4: Sections III, V.
Laine L. et al "Proposal for using Sine With Dwell on low friction for the evaluation of yaw stability for heavy vehicle combinations" IEEE International Conference on Vehicular Electronics and Safety, Sep. 22-24, 2008; abstract; figure 2; Section C.
International Search Report (Jun. 5, 2012) for corresponding International App. PCT/SE2011/000194.
International Preliminary Report on Patentability (Jan. 23, 2014) for corresponding International App. PCT/SE2011/000194.
Md. Manjurul Islam, Design Synthesis of Articulated Heavy Vehicles with Active Trailer Steering Systems, A Thesis presented to the University of Ontario Institute of Technology, Oshawa, Ontario, Canada, 2010, Md. Manjurul Islam 2010, pp. i-xv, 1-110.

* cited by examiner

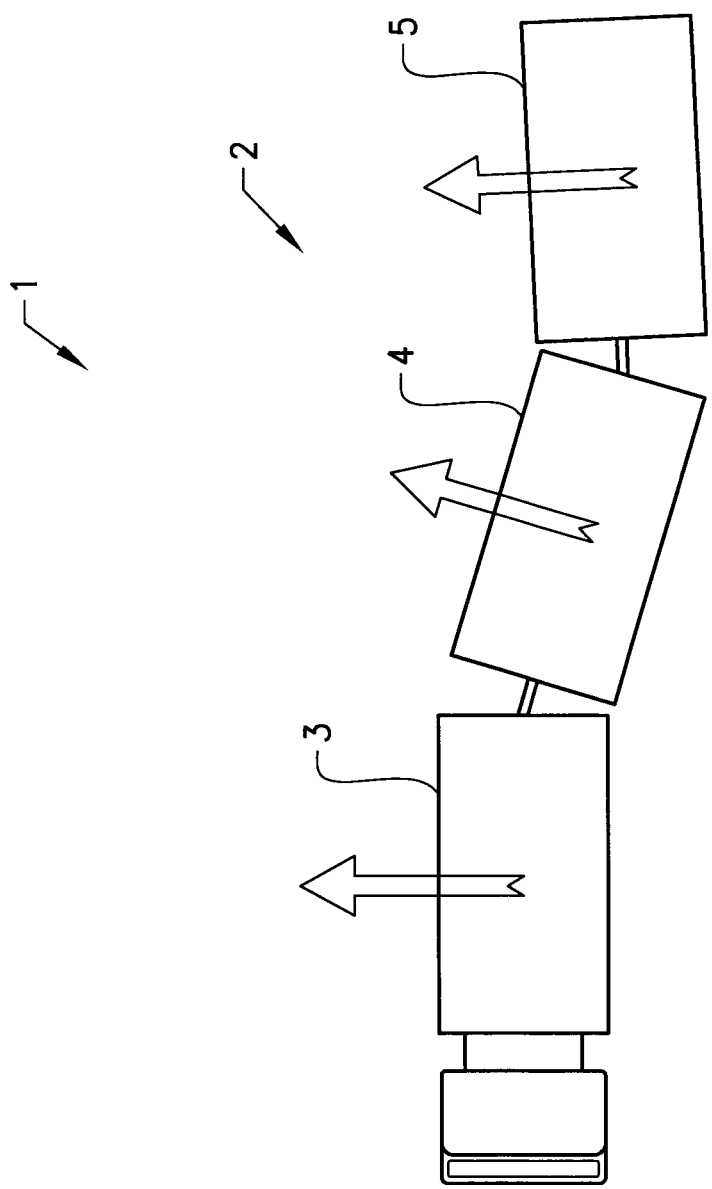

METHOD AND ARRANGEMENT FOR VEHICLE STABILIZATION

BACKGROUND AND SUMMARY

The present invention relates to an arrangement and a method for stabilizing a vehicle combination comprising a towing vehicle and at least one towed vehicle. The arrangement and method is especially suited for vehicle combinations having more than one towed vehicle.

In order to reduce the number of heavy vehicles on the roads, longer vehicle combinations comprising more than one towed vehicle are proposed for the use on regular roads in some countries. Apart from reducing the required number of towing vehicles for a specific load, the energy consumption and the emission of exhaust gases will also be reduced compared with traditional vehicle combinations. Normally, the length and the weight of the vehicle combination are controlled by law and regulations. In some countries, longer and/or heavier vehicle combinations are already allowed under restricted conditions. Such vehicles may comprise several towed vehicles and may be over 50 meters long and more. They are often used in remote areas and for specific purposes. In Australia, road trains comprising more than 4 trailers are used in some states and on some roads. Longer combination vehicles (LCV's) are also used in e.g. USA, Canada and Argentina. AH these LCV's are used under strict regulations.

Long vehicle combinations containing several towed vehicles are in general more instable than vehicles having one or a few towed vehicles at high speed. This means that long vehicle combinations are more prone to roll over, jack-knife, trailer swing out and to start skidding. On the other hand, long vehicle combinations are more transport efficient since their load capacity is higher.

One problem with a longer vehicle combination is the stability of the vehicle combination. Even with vehicle combinations having a single towed vehicle, such as a tractor trailer combination, stability problems may arise when braking or turning. One stability problem that may arise is that the trailer starts swinging from side to side. This may happen when the vehicle travels with a relatively high speed and changes lane or drives in curves. The stability of the vehicle combination will normally correct itself when the vehicle travels straight, but this may still affect the traffic around the vehicle, either by bumping in to other vehicles or by scaring drivers in the vicinity. Another type of stability problem arises when the vehicle combination brakes. One such problem is known as jackknifing, in which the trailer will spin around such that the tractor and trailer will resemble a folded pocket knife.

There are several ways of improving the stability of a vehicle combination in order to avoid accidents. Solutions reducing the turning angle for the trailer have been proposed, unsuccessfully. Anti-lock brakes and electronic brake force distribution controlled by an electronic control unit has reduced some types of accidents. Such solutions are mostly designed for a vehicle combination having a single trailer. For a longer vehicle combination having several towed vehicles, the proposed solutions will not suffice.

US 2010/070149 describes a trailer electronic braking system for a road train having a tractor and a plurality of trailers. The braking system includes a braking ECU on each trailer and a communication interface being provided so that the braking ECU on a first trailer and the braking ECU on a second trailer are able to communicate with one another. In use, the respective braking ECU on the first and second trailer receive an input from a respective sensor on the first and second trailer adapted to detect lateral acceleration and/or wheel speed. In the event that one of the sensors detects lateral acceleration and/or a wheel speed indicative of a loss of stability, the sensor generates a signal for actuating stability control, which signal is passed via the communication interface to the braking ECU on the other trailer, so that the other trailer can actuate stability control.

This system is adapted to measure the actual lateral acceleration or wheel speed of a trailer. If the ECU of one trailer detects a predefined condition indicative of a stability problem, a signal is sent to the ECU of the other trailer, such that the ECU of the other trailer can actuate the brakes of that trailer. This system is thus adapted to control actual, measured conditions when they already have occurred.

WO 2010087022 describes a behavior controller of a vehicle combination (tractor +trailer/semi trailer) for preventing a jack-knife phenomenon While taking account of a fact that relative rotary action of the trailer and tractor changes according to the vehicle speed or the magnitude of deceleration. The controller comprises a brake force/drive force control section for controlling the brake force/drive force of a tractor or a trailer so as to reduce the difference in yaw rate between the tractor and the trailer. The brake force is controlled when the size of deviation of yaw rate of the tractor and yaw rate of the trailer exceeds a specified threshold. The brake force of each tractor or trailer wheel can be controlled independently.

This system is adapted to measure the actual rotary action between a tractor and a single trailer. This system is thus adapted to control actual, measured conditions when they already have occurred.

In some cases, there may however be an advantage in predicting the movement of the towed vehicles in advance in order to limit the swaying or swinging of the towed vehicles during e.g. a lane change. There is thus still room for improvements.

It is desirable to provide an arrangement for improving stability of a vehicle combination comprising a towing vehicle and at least one towed vehicle. It is also desirable to provide a method for improving stability of a vehicle combination comprising a towing vehicle and at least one towed vehicle.

In an arrangement for improving stability of a vehicle combination comprising a towing vehicle and at least one towed vehicle, where the at least one towed vehicle comprises at least one actively steered axle and/or an individual brake on at least one axle, where the towing vehicle and the at least one towed vehicle each comprises a lateral acceleration determining means for determining the lateral acceleration of the vehicle and the at least one towed vehicle, where the arrangement further comprises a vehicle combination model adapted for determining a desired delay value between the lateral acceleration of the towing vehicle and the lateral acceleration of the at least one towed vehicle, the problem is solved in that the arrangement is adapted to stabilize the at least one towed vehicle by using the determined lateral acceleration of the towing vehicle and the desired delay value for the at least one towed vehicle to establish a desired lateral acceleration for the at least one towed vehicle, and to control the steered axle and/or the individual brake of the at least one towed vehicle such that the determined lateral acceleration of the at least one towed vehicle corresponds to the desired lateral acceleration of the at least one towed vehicle.

By this first embodiment of the arrangement, the arrangement will determine the actual lateral acceleration of the towing vehicle. The arrangement further comprises a vehicle combination model adapted for determining a desired delay value between the lateral acceleration of the towing vehicle and the lateral acceleration of each towed vehicle. By applying this delay value to the lateral acceleration value of each towed vehicle, each towed vehicle will behave similar to the towing vehicle. The stability of the towed vehicles can thus be improved.

The lateral acceleration of the towing vehicle can be determined either by estimation or by a measurement. The estimation may be done by using an estimation method based on the roll behavior of the vehicle or on other vehicle properties, such as wheel speed of the vehicle, vehicle mass, vehicle length, steering angle etc. Lateral acceleration measurements are done by using an acceleration sensor, preferably measuring the acceleration in three dimensions.

In an advantageous development of the inventive arrangement, the amplitude of the desired lateral acceleration of the at least one towed vehicle and the amplitude of the determined lateral acceleration of the towing vehicle are proportional when carrying out a manouvre. The ratio between the amplitude values is preferably selected such that the ratio is close to 1, and is preferably in the range between 0.9-1.2. In this way, the damping of the lateral acceleration for the towed vehicles will improve the stability of the vehicle combination.

It is possible to use a deadband during the stabilizing of the vehicle combination When comparing the determined lateral acceleration with the reference lateral acceleration. in this way, small unnecessary adjustments of the vehicle combination are avoided when the vehicle combination travels on a straight road or behaves naturally as desired. Even when a vehicle combination travels straight, the towed vehicles may sway slightly sideways. By using a deadband, there will be no stabilizing of the vehicle combination for small sideways movements in this case. This is especially advantageous when the stabilizing actuators are wheel brakes, since the brakes do not have to be actuated constantly.

In a method for stabilizing a vehicle combination comprising a towing vehicle and at least one towed vehicle, the steps of establishing a desired delay value for the lateral acceleration between the towing vehicle and the at least one towed vehicle in the vehicle combination by using a vehicle combination model, determining the lateral acceleration of the towing vehicle, establishing a desired lateral acceleration value for each towed vehicle by using the measured lateral acceleration and the established delay value, measuring the actual lateral acceleration of the at least one towed vehicle, comparing the actual lateral acceleration with the desired lateral acceleration, and controlling the lateral acceleration of a towed vehicle to the desired lateral acceleration value by controlling steering axles and/or individual brakes on the at least one towed vehicle are comprised.

With the inventive method, a vehicle combination comprising at least one towed vehicle can be stabilized. The proportional factor of the lateral acceleration can be selected but is advantageously close to one.

BRIEF DESCRIPTION OF DRAWINGS

The invention will be described in greater detail in the following, with reference to the attached drawings, in which FIG. 1 shows a schematic vehicle combination comprising a towing vehicle and two towed vehicles.

DETAILED DESCRIPTION

Figure 2A:
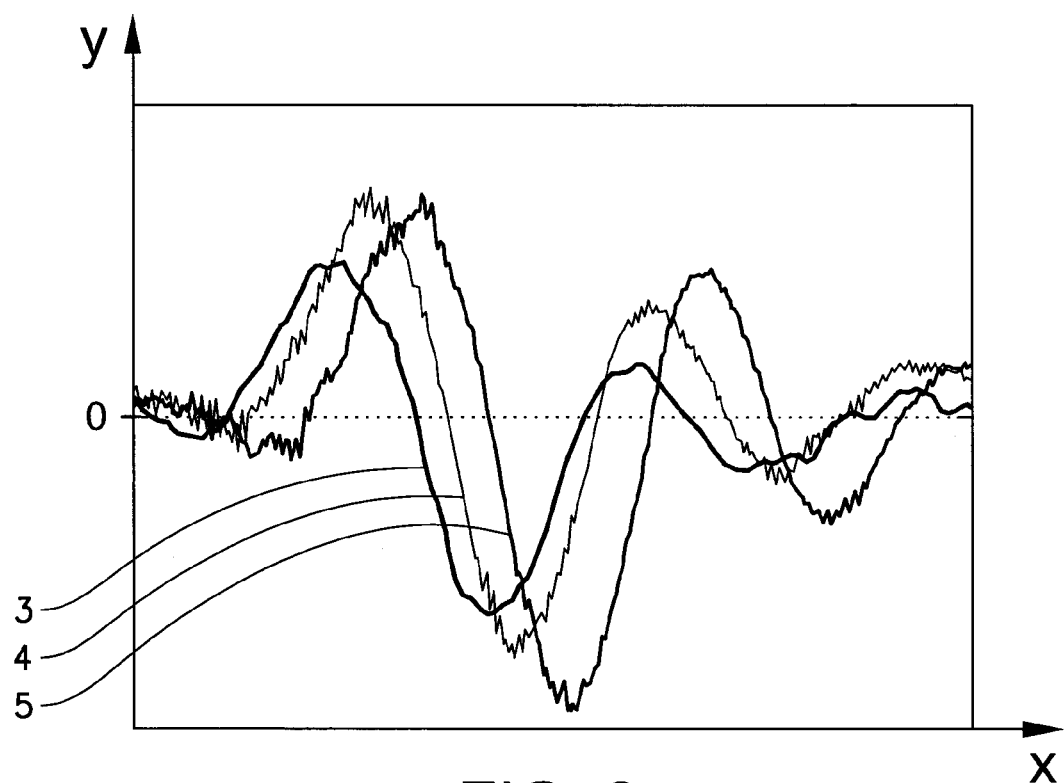
FIG. 2a shows an example of lateral acceleration behavior for a vehicle combination without an inventive arrangement for stabilizing: a vehicle combination.

The embodiments of the invention with further developments described in the following are to be regarded only as examples and are in no way to limit the scope of the protection provided by the patent claims. The arrangement is suitable for all kinds of vehicle combinations comprising at least one towed vehicle, but is especially suitable for heavy vehicles such as trucks towing two or more trailers, since vehicle combinations having more towed vehicles tend to be more unstable than vehicle combinations having one or a few towed vehicles.

FIG. 1 shows a schematic vehicle combination 2 comprising a towing vehicle 3 and two towed vehicles 4, 5. The towing vehicle is a regular truck or tractor adapted for commercial highway use. A towed vehicle may be a drawbar trailer having both front and rear axles. A towed vehicle may also be a semi-trailer having only rear axles in combination with a dolly. Different combinations of such trailers or semi-trailers pulled by either a truck or a tractor can be comprised in a vehicle combination. The lateral acceleration of each vehicle is indicated by a lateral arrow.

For long combinations comprising several towed vehicles, the maximum lateral acceleration is in general larger for the towed unit in a dynamic maneuver and is often the largest at the most rearward towed vehicle. This can be seen when a vehicle combination comprising a truck with a dolly and semitrailer performs a lane-change on a highway. Cars nearby can find it dangerous when the trailers start swinging. The rearmost towed vehicle will show the largest sideway deviation during the maneuver. This effect is known as rearward amplification. The rearward amplification is defined as the ratio of the maximum lateral acceleration between the towing vehicle and the towed unit, i.e. each towed vehicle.

On a vehicle combination adapted for the inventive arrangement, all towed vehicles should be equipped with actuators in the form of either individually controlled brakes or an actively controlled steering. Preferably, each axle of a towed vehicle is provided with either individually controlled brakes or an actively controlled steering. Depending on the number of axles on a towed vehicle, it is also possible that less than all axles are provided with either individually controlled brakes or an actively controlled steering. As an example, a towed vehicle having three axles may have two steered axles. The number of steered axles or individually braked axles is used as an input to the vehicle combination model.

In the inventive arrangement, the control strategy is to utilize the actuators such that the lateral acceleration oldie towed vehicles are equal or close to equal to the measured lateral acceleration of the towing vehicle except for a delay. It is also possible to set the rearward amplification to a selected constant level close to one, and preferably lower than 1.5. In the arrangement, the actual measured lateral acceleration of each towed vehicle is compared at each time step to this reference. The momentary lateral acceleration of the towing vehicle at each time step is thus used as a reference for the arrangement in order to control the stability of the vehicle combination.

In the arrangement and the method, the following steps are comprised in the control approach. First, a desired delay between the lateral acceleration of the towing vehicle and the lateral acceleration of each towed vehicle is calculated. This calculation is done by using a vehicle combination model which may have wheel speed, friction between road and tires, vehicle combination properties such as weight (which can be measured by known vehicle weight measuring devices adapted to measure the weight of the vehicle) and length, steering frequency and steering angle as input values.

When a desired delay value for each towed vehicle is calculated, the actual lateral acceleration for the towing vehicle is determined. The actual lateral acceleration can be determined either by measuring the actual lateral acceleration with an acceleration sensor or by estimating the actual lateral acceleration by using the roll behavior of the vehicle or by using other vehicle properties such as vehicle speed and steering angle.

A reference lateral acceleration value is then obtained for each towed vehicle by using the actual lateral acceleration of the towing vehicle together with the desired delay value for each towed vehicle. The reference lateral acceleration value for each towed vehicle is then compared with an actual lateral acceleration value for each towed vehicle and the actuators are controlled such that the actual lateral acceleration of the towed vehicle follows the reference lateral acceleration value. The actual lateral acceleration for a towed vehicle may also be obtained either by measuring the lateral acceleration with an acceleration sensor or by estimating a lateral acceleration value by using other vehicle properties.

The actuators of each towed vehicle are controlled by a control unit such that the lateral acceleration of the towed vehicles follows the reference lateral acceleration value. If the actuators are wheel brakes, the wheel brakes are controlled such that the wheel brakes will help the towed vehicle to follow the track of the towing vehicle. If the vehicle combination makes a lane change, the lane change will cause the towed vehicles to make a tail swing out. The tail swing out can be prevented or minimized by actuating the brakes on one side of the towed vehicles more than the brakes on the other side, e.g. the brakes on the right side of the towed vehicle are actuated more than the brakes on the left side. If the actuators are steered axles, the wheels will be steered somewhat in the opposite direction of the lane change direction, in order to follow the reference lateral acceleration value. The control unit may be a stand-alone control unit or it may be integrated in an existing control unit, such as in the brake control unit.

One example of a common vehicle combination used on some markets is a truck with a dolly and a semi-trailer system. The dolly is commonly provided with two axles and the semi-trailer is commonly provided with three axles. By fitting actively steered axles on the dolly and the semitrailer and by controlling them with the inventive arrangement and method, a stability improvement, of around 40% or more may be obtained during a lane change maneuver compared to the same combination having non-steered axles. The same result may be obtained by providing the dolly and the semi-trailer with individually controllable wheel brakes.

An example of measurements for such a vehicle combination is shown in FIG. 2. The x-axis shows time and the y-axis shows lateral acceleration. Curve 3 shows the lateral acceleration of the truck, curve 4 shows the lateral acceleration of the dolly and curve 5 shows the lateral acceleration of the semi-trailer. FIG. 2a shows the behavior of a conventional vehicle combination without individually controllable brakes or actively steered axles. For this vehicle combination, the rearward amplification is significantly greater than one, and is in the range above 1.5, and there is no substantial damping of the second oscillation.

Figure 2B:
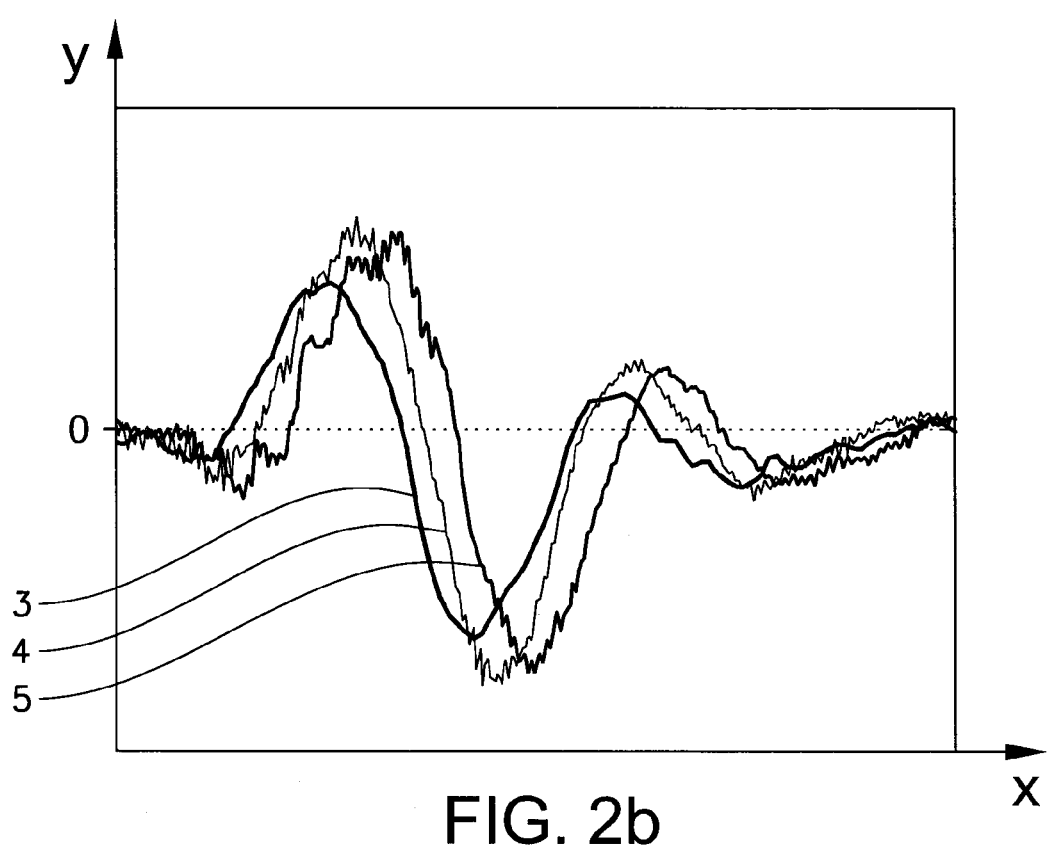
FIG. 2b shows an example of lateral acceleration behavior for a vehicle combination with an inventive arrangement for stabilizing a vehicle combination.

In FIG. 2b, the behavior of a vehicle combination having either individually controlled brakes or actively steered axles is shown. Here, the rearward amplification is close to one and there is a substantial damping, of the lateral acceleration.

In the inventive arrangement, the behavior of the vehicle combination can be predicted by using, a vehicle combination model. In this way, the control of the towed vehicles can be more preventative which means that less control input energy for the brakes or steering is required for the stabilization of the vehicle combination, The stabilization is also faster and the damping of the system is improved.

The arrangement is suitable for vehicle combinations having at least one towed vehicle. The arrangement is however preferably used for vehicle combinations having a towed unit comprising at least two towed vehicles.

In the example described above, a vehicle combination having two towed vehicles is described. By using a vehicle combination model adapted for the number of towed vehicles, the arrangement can be used to stabilize vehicle combinations having three and more towed vehicles. For a vehicle combination having three towed vehicles, three delay values will be used together with the determined lateral acceleration of the towing vehicle to stabilize the vehicle combination.

In a development of the inventive arrangement, only the most rearward towed vehicle is used to stabilize the vehicle combination. In one example, the vehicle combination comprises a truck, a dolly and a semi-trailer. Here, only the semi-trailer will be used to stabilize the vehicle combination. In this case, the desired delay value is established between the truck and the semi-trailer. The actual lateral acceleration for the truck is then determined. A reference lateral acceleration value for the semi-trailer is then obtained from the actual lateral acceleration of the truck and the desired delay value. The actuators of the semi-trailer are then controlled by the control unit such that the actual lateral acceleration of the semitrailer follows the reference lateral acceleration value. The control unit sends control signals to the steering axles and/or the individually controlled brakes of the semi-trailer. Depending on the types of the different towed vehicles contained in the vehicle combination, it is possible to obtain delay values for only some of the towed vehicles. Preferably, towed vehicles at the rear of the vehicle combination are used to stabilize the vehicle combination.

Figure 3:
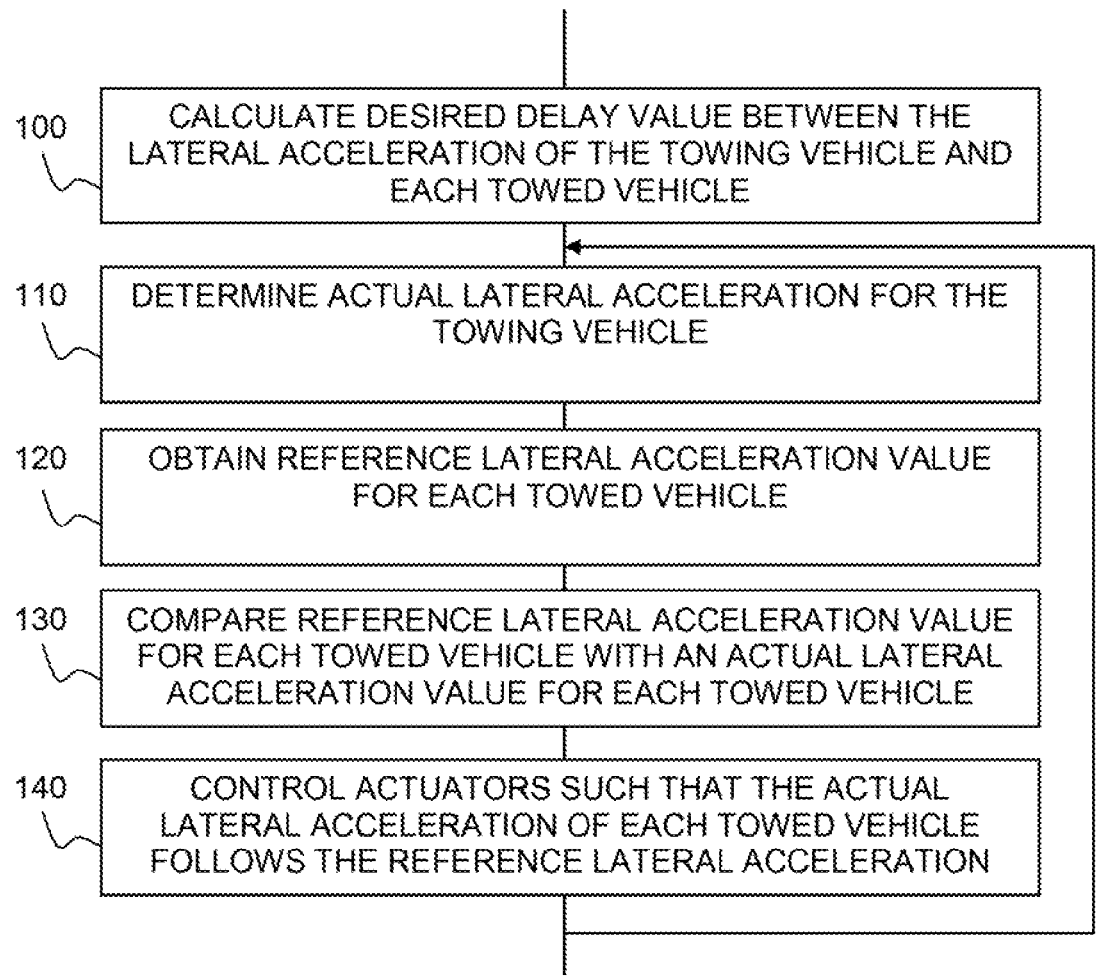
FIG. 3 shows a schematic flow chart of an inventive method for stabilizing a vehicle combination.

FIG. 3 shows a schematic flow chart of a method for method for stabilizing a vehicle combination comprising a towing vehicle and at least one towed vehicle.

In step 100, a desired delay value between the lateral acceleration of the towing vehicle and each towed vehicle is calculated. This calculation is done by using a vehicle combination model which may have wheel speed, friction between road and tires, vehicle properties such as weight (which can be measured by known vehicle weight measuring devices adapted to measure the weight of the vehicle) and length, steering frequency and steering angle as input values. One individual delay value for each towed vehicle is calculated.

In step 110, the actual lateral acceleration for the towing vehicle is determined. The actual lateral acceleration can be determined either by measuring the actual lateral acceleration with an acceleration sensor or by estimating the actual lateral acceleration by using the roll behavior of the vehicle or by using other vehicle properties such as wheel speed and steering angle.

In step 120, a reference lateral acceleration value is obtained for each towed vehicle by using the actual lateral acceleration of the towing vehicle together with the desired delay value for each towed vehicle. The reference lateral acceleration value will be used to control the lateral acceleration of each towed vehicle.

In step 130, a reference lateral acceleration value for each towed vehicle is then compared with an actual lateral acceleration value for each towed vehicle. The actual lateral acceleration for a towed vehicle may be obtained either by measuring the lateral acceleration with an acceleration sensor or by estimating a lateral acceleration value by using other vehicle properties. When the actual lateral acceleration value for a towed vehicle differs from the reference lateral acceleration value by a predefined threshold value, the control unit of the arrangement will compensate for this difference. It is possible to use a deadband around the reference lateral acceleration in order to avoid oscillations when the vehicle travels straight. The deadband width may either be an absolute value or may be dependent on the value of the reference lateral acceleration.

In step 140, the actuators are controlled by the control unit such that the actual lateral acceleration of each towed vehicle follows the reference lateral acceleration value. The control unit sends control signals to the steering axles and/or the individually controlled brakes on each towed vehicle.

The steps 110 to 140 are then repeated until the maneuver of the vehicle combination is completed. The desired delay values for each towed vehicle is preferably updated when the vehicle properties changes, such that the when the load of the vehicle combination changes. If the number of vehicles in the vehicle combination changes, a new vehicle combination model is required, which also mean that the desired delay values are recalculated.

The invention is not to be regarded as being limited to the embodiments described above, a number of additional variants and modifications being possible within the scope of the subsequent patent claims.

REFERENCE SIGNS

1: Arrangement
2: Vehicle combination
3: Towing vehicle
4: First towed vehicle
5: Second towed vehicle

The invention claimed is:

1. An arrangement for improving stability of a vehicle combination comprising a towing vehicle and at least one towed vehicle, Where the at least one towed vehicle comprises at least one actively steered axle and/or an individually controlled wheel brake on at least one axle, where the towing vehicle and the at least one towed vehicle each comprises a lateral acceleration determining means for determining lateral acceleration of the towing vehicle and the at least one towed vehicle, the lateral acceleration determining means being an acceleration sensor, where the arrangement further comprises a vehicle combination model adapted for determining a desired delay value between the lateral acceleration of the towing vehicle and the lateral acceleration of the at least one towed vehicle, the arrangement is adapted to stabilize the at least one towed vehicle by using the determined lateral acceleration of the towing vehicle and the desired delay value for the at least one towed vehicle to establish a reference lateral acceleration for the at least one towed vehicle, and to control the actively steered axle and/or the individually controlled brake of the at least one towed vehicle such that the determined lateral acceleration of the at least one towed vehicle corresponds to the reference lateral acceleration of the at least one towed vehicle.

2. Arrangement according to claim 1, wherein an amplitude of the reference lateral acceleration of the at least one towed vehicle and an amplitude of the determined lateral acceleration of the towing vehicle are proportional.

3. Arrangement according to claim 1, wherein the arrangement is adapted to improve the stability for a vehicle combination comprising a towing vehicle and two towed vehicles, where each towed vehicle comprises lateral acceleration determining means for determining the lateral acceleration of respective towed vehicle, where the vehicle combination model is adapted for determining, the desired delay value between the lateral acceleration of the towing vehicle and the lateral acceleration of each towed vehicle, wherein the arrangement is adapted to stabilize each towed vehicle by using the determined lateral acceleration of the towing vehicle and the desired delay value for respective towed vehicle to establish the reference lateral acceleration for each towed vehicle, and to control the steered axle and/or the individually controlled brake of each towed vehicle such that the determined lateral acceleration of each towed vehicle corresponds to the reference lateral acceleration of each towed vehicle.

4. Arrangement according to claim 1, wherein a deadband is used, when comparing the determined lateral acceleration to the reference lateral acceleration of the towed vehicle.

5. Arrangement according to claim 4, wherein a deadband width of the deadband is an absolute value.

6. Arrangement according to claim 4, wherein a deadband width of the deadband is dependent on the value of the reference lateral acceleration.

7. Arrangement according to claim 1, wherein the vehicle combination model is implemented in a control unit in a vehicle control system.

8. Vehicle combination comprising an arrangement for improving stability of the vehicle combination comprising a towing vehicle and at least one towed vehicle, where the at least one towed vehicle comprises at least one actively steered axle and/or an individually controlled wheel brake on at least one axle, where the towing vehicle and the at least one towed vehicle each comprises a lateral acceleration determining means for determining the lateral acceleration of the towing vehicle and the at least one towed vehicle, the lateral acceleration determining means being an acceleration sensor, Where the arrangement further comprises a vehicle combination model adapted for determining a desired delay value between the lateral acceleration of the towing vehicle and the lateral acceleration of the at least one towed vehicle, the arrangement is adapted to stabilize the at least one towed vehicle by using the determined lateral acceleration of the towing vehicle and the desired delay value for the at least one towed vehicle to establish a reference lateral acceleration for the at least one towed vehicle, and to control the actively steered axle and/or the individually controlled brake of the at least one towed vehicle such that the determined lateral acceleration of the at least one towed vehicle corresponds to the reference lateral acceleration of the at least one towed vehicle.

9. Vehicle according to claim 8, wherein the at least one towed vehicle comprises a dolly and a semi-trailer.

10. Vehicle according to claim 8, wherein the at least one towed vehicle comprises at least one drawbar trailer.

11. Vehicle according to claim 8, wherein the at least one towed vehicle is a dolly or a semi-trailer.

12. A method for stabilizing a vehicle combination comprising a towing vehicle and at least one towed vehicle, comprising:
   establishing a desired delay value for lateral acceleration between the towing vehicle and the at least one towed vehicle in the vehicle combination by using a vehicle combination model,
   determining lateral acceleration of the towing vehicle,
   establishing a reference lateral acceleration value for each towed vehicle by using the determined lateral acceleration of the towing vehicle and the established delay value,
   determining an actual lateral acceleration of the at least one towed vehicle,
   comparing the actual lateral acceleration with the reference lateral acceleration,
   controlling the lateral acceleration of the at least one towed vehicle to the reference lateral acceleration value by controlling steering axles and/or individual brakes on the at least one towed vehicle.

13. A control unit comprising a program for performing, when the program is run on the control unit, a method for stabilizing a vehicle combination comprising a towing vehicle and at least one towed vehicle, the method comprising:
   establishing a desired delay value for lateral acceleration between the towing vehicle and the at least one towed vehicle in the vehicle combination by using a vehicle combination model,
   determining lateral acceleration of the towing vehicle,
   establishing a reference lateral acceleration value for each towed vehicle by using the determined lateral acceleration of the towing, vehicle and the established delay value,
   determining the actual lateral acceleration of the at least one towed vehicle,
   comparing the actual lateral acceleration with the reference lateral acceleration
   controlling the lateral acceleration of the at least one towed vehicle to the reference lateral acceleration value by controlling steering axles and/or individual brakes on the at least one towed vehicle.

14. A computer program product comprising program code stored on a non-transitory computer readable medium for performing, when the program product is run on a control unit, a method for stabilizing a vehicle combination comprising a towing vehicle and at least one towed vehicle, the method comprising:
   establishing a desired delay value for the lateral acceleration between the towing vehicle and the at least one towed vehicle in the vehicle combination by using a vehicle combination model,
   determining the lateral acceleration of the towing vehicle,
   establishing a reference lateral acceleration value for each towed vehicle by using the determined lateral acceleration of the towing vehicle and the established delay value,
   determining the actual lateral acceleration of the at least one towed vehicle,
   comparing the actual lateral acceleration with the reference lateral acceleration,
   controlling the lateral acceleration of the at least one towed vehicle to the reference lateral acceleration value by controlling steering axles and/or individual brakes on the at least one towed vehicle.

15. An arrangement for improving stability of a vehicle combination comprising a towing vehicle and at least one towed vehicle, where the at least one towed vehicle comprises at least one actively steered axle and/or an individually controlled wheel brake on at least one axle, where the towing vehicle and the at least one towed vehicle each comprises a lateral acceleration determining means for determining the lateral acceleration of the towing vehicle and the at least one towed vehicle, the lateral acceleration determining means being a software module in a control unit, where the arrangement fluffier comprises a vehicle combination model adapted for determining a desired delay value between the lateral acceleration of the towing, vehicle and the lateral acceleration of the at least one towed vehicle, the arrangement is adapted to stabilize the at least one towed vehicle by using the determined lateral acceleration of the towing vehicle and the desired delay value for the at least one towed vehicle to establish a reference lateral acceleration for the at least one towed vehicle, and to control the actively steered axle and/or the individually controlled brake of the at least one towed vehicle such that the determined lateral acceleration of the at least one towed vehicle corresponds to the reference lateral acceleration of the at least one towed vehicle.

* * * * *